US012782260B2

(12) United States Patent
Irvine et al.

(10) Patent No.: US 12,782,260 B2
(45) Date of Patent: Nov. 3, 2026

(54) METHODS AND SYSTEMS FOR ADJUSTING A TRAINING GATE TO ACCOMMODATE FLOW CYTOMETER DATA

(71) Applicant: Becton, Dickinson and Company, Franklin Lakes, NJ (US)

(72) Inventors: Allison Irvine, Oakland, CA (US); Nikolay Samusik, Jacksonville, OR (US); Joseph T. Trotter, La Jolla, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 1072 days.

(21) Appl. No.: 17/154,427

(22) Filed: Jan. 21, 2021

(65) Prior Publication Data

US 2021/0278333 A1 Sep. 9, 2021

Related U.S. Application Data

(60) Provisional application No. 63/049,735, filed on Jul. 9, 2020, provisional application No. 62/968,520, filed on Jan. 31, 2020.

(51) Int. Cl.
*G01N 15/1429* (2024.01)
*G01N 15/10* (2024.01)
*G01N 15/1434* (2024.01)

(52) U.S. Cl.
CPC ..... *G01N 15/1429* (2013.01); *G01N 15/1434* (2013.01); *G01N 2015/1006* (2013.01)

(58) Field of Classification Search
CPC ........... G01N 15/1429; G01N 15/1434; G01N 2015/1006; G01N 33/4915; G01N 15/1459; G01N 2015/1402
See application file for complete search history.

(56) References Cited

U.S. PATENT DOCUMENTS 5,136,690 A 8/1992 Becker et al.
6,014,904 A * 1/2000 Lock .................... G06V 20/698 73/865.5
7,383,370 B1 6/2008 Sancheti et al.
8,290,625 B2 10/2012 Degeal et al.
9,350,763 B1 5/2016 Mchugh et al.
9,970,857 B2 5/2018 Lui et al.
11,573,182 B2 * 2/2023 Roederer ............. G06V 10/764
2004/0119029 A1 6/2004 Nagata et al.
2004/0143423 A1 7/2004 Parks et al.
2008/0119421 A1 5/2008 Tuszynski et al.
2008/0263468 A1 10/2008 Cappione et al.
2009/0196511 A1 8/2009 Gendron et al.
2009/0307248 A1 12/2009 Moser et al.
2011/0191359 A1 8/2011 Larriba et al.
2012/0202237 A1 8/2012 Sedoglavich et al.
2012/0220837 A1 8/2012 Alpert et al.
2014/0222381 A1 8/2014 Nitta
2016/0223554 A1 * 8/2016 Cesano .............. G01N 33/5011
2017/0061657 A1 * 3/2017 Fainshtein ............. G09G 5/363
2017/0261930 A1 9/2017 Mathuis et al.
2018/0018386 A1 * 1/2018 Orlova .................. G06T 11/206
2018/0135012 A1 * 5/2018 Mata-Fink ........... C12N 5/0644
2018/0286038 A1 10/2018 Jalali et al.
2019/0302000 A1 10/2019 Lo
2019/0369001 A1 12/2019 Alcorn et al.
2020/0018704 A1 * 1/2020 Sussman ............ G01N 21/6428
2022/0207895 A1 * 6/2022 Baumgrass ............ G06N 20/20

FOREIGN PATENT DOCUMENTS

WO WO2007010236 A1 1/2007
WO WO2007091081 1/2008

OTHER PUBLICATIONS

Jorge-Peñas , Free Form Deformation-Based Image Registration Improves Accuracy of Traction Force Microscopy, PLoS ONE 10(12): e0144184. doi:10.1371/journal. pone.0144184, Aug. 19, 2015 (Year: 2015).*
Verschoor et al. (An introduction to automated flow cytometry gating tools and their implementation, Frontier in Immunology, vol. 6—Jul. 26, 2015) (Year: 2015).*
Jung (Two-dimensional histogram specification using two-dimensional cumulative distribution function, Jun. 1, 2014, Electronics Letters, vol. 50, pp. 842-900) (Year: 2014).*
Aghaeepour, et al. "Critical assessment of automated flow cytometry data analysis techniques", Nat Methods. Mar. 2013;10(3):228-38.
Bashashati, et al. "Recent Bioinformatics Advances in the Analysis of High Throughput Flow Cytometry Data", Advances in Bioinformatics 2009, pp. 1687-8027.
Cossarizza, et al. "Guidelines for the use of flow cytometry and cell sorting in immunological studies", European Journal of Immunology 49(10):1457-1973, 2017.
(Continued)

*Primary Examiner* — G. Steven Vanni
*Assistant Examiner* — Ghazal Sabour
(74) *Attorney, Agent, or Firm* — Bret E. Field; Melissa L. Nakamoto; BOZICEVIC, FIELD & FRANCIS LLP

(57) ABSTRACT

Methods for adjusting a training gate prepared from a first set of flow cytometer data to accommodate a second set of flow cytometer data are provided. In embodiments, methods include generating an image for each of the first and second sets of flow cytometer data. In some instances, generating an image includes organizing the data into two-dimensional bins, and assigning shades to each bin such that the bins are represented by pixels. In some instances, methods include warping with a computer implemented algorithm the generated image of the first set of flow cytometer data such that it maximizes resemblance to the second set of flow cytometer data, and applying the same transformation to the training gate. In some embodiments, methods include overlaying the adjusted training gate onto the generated image of the second set of flow cytometer data. Systems and computer-readable media for adjusting a training gate are also provided.

11 Claims, 9 Drawing Sheets

(56) References Cited

OTHER PUBLICATIONS

Lee, et al. "High-Throughput Analysis of Clinical Flow Cytometry Data by Automated Gating", Bioinform Biol Insights, Apr. 3, 2019, 9 pages.
Malek, et al. "flowDensity: reproducing manual gating of flow cytometry data by automated density-based cell population identification", Bioinformatics, vol. 31 No. 4 2015, pp. 606-607.
Naumann, et al, "The curvHDR method for gating flow cytometry samples", BMC Bioinformatics vol. 11, Article No. 44 (2010), 13 pages.
Penas "Free Form Deformation Based Image Registration Improves Accuracy of Traction Force Microscopy" PLoS ONE, vol. 10, Issue 12, pp. 1-22.

* cited by examiner

400

602b

602a

601

METHODS AND SYSTEMS FOR ADJUSTING A TRAINING GATE TO ACCOMMODATE FLOW CYTOMETER DATA

CROSS-REFERENCE TO RELATED APPLICATIONS

This application is related to U.S. Provisional Application Ser. No. 62/968,520 filed on Jan. 31, 2020 and U.S. Provisional Application Ser. No. 63/049,735 filed on Jul. 9, 2020, the disclosures of which are herein incorporated by reference.

INTRODUCTION

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. For example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of detectors, one for each of the scatter parameters to be measured, and one or more for each of the distinct dyes to be detected are included in the analyzer. For example, some embodiments include spectral configurations where more than one sensor or detector is used per dye. The data obtained comprise the signals measured for each of the light scatter detectors and the fluorescence emissions.

Flow cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured features. The use of standard file formats, such as an "FCS" file format, for storing data from a particle analyzer facilitates analyzing data using separate programs and/or machines. Using current analysis methods, the data typically are displayed in 1-dimensional histograms or 2-dimensional (2D) plots for ease of visualization, but other methods may be used to visualize multidimensional data.

The parameters measured using, for example, a flow cytometer typically include light at the excitation wavelength scattered by the particle in a narrow angle along a mostly forward direction, referred to as forward scatter (FSC), the excitation light that is scattered by the particle in an orthogonal direction to the excitation laser, referred to as side scatter (SSC), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by flow cytometry are often multidimensional, where each cell corresponds to a point in a multidimensional space defined by the parameters measured. Populations of cells or particles can be identified as clusters of points in the data space. The identification of clusters and, thereby, populations can be carried out manually by drawing a gate around a population displayed in one or more 2-dimensional plots, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; 6,944,338; and 8,990,047; each of which is incorporated herein by reference. Gating is used to make sense of the large quantity of data that may be generated from a sample. Accordingly, facilitating the creation and manipulation of gates can help improve the speed and accuracy of understanding what the results mean.

SUMMARY

Aspects of the invention include methods for adjusting a training gate prepared from a first set of flow cytometer data to accommodate a second set of flow cytometer data. In some embodiments, the first set of flow cytometer data contains populations that are understood to exhibit certain parameters, and includes a training gate defined by a set of vertices that has been drawn to distinguish a population of interest from the remainder of the data. Methods of the instant disclosure include adjusting the training gate to accommodate a second set of flow cytometer data (i.e., a set of data that has yet to be gated) such that the adjusted gate fits an analogous population in the second set of flow cytometer data. In embodiments, methods include obtaining first and second sets of flow cytometer data, and generating an image for each of the first and second sets of flow cytometer data (i.e., a separate image for each set). In some embodiments, generating an image includes organizing the flow cytometer data into two-dimensional bins based on the number of analytes present in a data plot within a given region. In some embodiments, flow cytometer data is binned based on the status of the data with respect to one or more different parameters (e.g., forward scatter, side-scatter, fluorescent). In embodiments, each bin possesses a representative value determined by averaging the values (e.g., with respect to a parameter) of data contained within a bin. After data is binned, methods include creating a two-dimensional histogram based on the binned data, and calculating a cumulative distribution function based on the histogram. Methods further include entering the representative (e.g., average) value from each bin into the calculated cumulative distribution function in order to determine an image generation value that serves as the basis for assigning a shade (i.e., lightness or darkness), such that bins are represented by pixels. After images are generated, methods include warping with a processor implemented algorithm the generated image of the first set of flow cytometer data to maximize resemblance to the generated image of the second set of flow cytometer data. In embodiments, the processor implemented algorithm is an image registration algorithm that includes a mathematical deformation model employing B-splines for warping the generated image of the first set of flow cytometer data. In some embodiments, the same warping transformation applied to the generated image of the first set of flow cytometer data is subsequently applied to the training gate by using B-spline coefficients to define a function for warping the training gate. In embodiments, the training gate is subsequently overlaid onto the generated image of the second set of flow cytometer data by extracting the vertices from the adjusted gate and transferring them to the second set of flow cytometer data, thereby reconstituting the adjusted training gate in the generated image of the second set of flow cytometer data.

Aspects of the invention further include systems for adjusting a training gate prepared from a first set of flow cytometer data to accommodate a second set of flow cytometer data. In embodiments, the first set of flow cytometer data is obtained from an input module configured to receive and/or store flow cytometer data, and the second set of flow cytometer data is obtained from a particle analyzer. The subject systems additionally include a processor having memory operably coupled to the processor wherein the memory includes instructions stored thereon, which when executed by the processor, cause the processor to adjust a training gate prepared from the first set of flow cytometer data to accommodate the second set of flow cytometer data. In embodiments, the processor is configured to adjust the training gate to accommodate the second set of flow cytometer data (i.e., a set of data that has yet to be gated) such that the adjusted gate fits an analogous population in the second set of flow cytometer data. In embodiments, the processor is configured to generate an image for each of the first and second sets of flow cytometer data (i.e., a separate image for each set). In some embodiments, generating an image includes organizing the flow cytometer data into two-dimensional bins based on the number of analytes present in a data plot within a given region. In some embodiments, flow cytometer data is binned based on the status of the data with respect to one or more different parameters (e.g., forward scatter, side-scatter, fluorescent). In embodiments, each bin possesses a representative value determined by averaging the values (e.g., with respect to a parameter) of data contained within a bin. After data is binned, the processor may be configured to create a two-dimensional histogram based on the binned data, and calculate a cumulative distribution function based on the histogram. The processor may be further configured to enter the representative (e.g., average) value from each bin into the calculated cumulative distribution function in order to determine an image generation value that serves as the basis for assigning a shade (i.e., lightness or darkness), such that bins are represented by pixels. After images are generated, the processor may be configured to warp with a processor implemented algorithm the generated image of the first set of flow cytometer data to maximize resemblance to the generated image of the second set of flow cytometer data. In embodiments, the processor implemented algorithm is an image registration algorithm that includes a mathematical deformation model employing B-splines for warping the generated image of the first set of flow cytometer data. In some embodiments, the same warping transformation applied to the generated image of the first set of flow cytometer data is subsequently applied to the training gate by using B-spline coefficients to define a function for warping the training gate. In embodiments, the training gate is subsequently overlaid onto the generated image of the second set of flow cytometer data by extracting the vertices from the adjusted gate and transferring them to the second set of flow cytometer data.

Aspects of the invention further include computer-controlled systems and computer-readable storage media, including one or more computers for complete automation or partial automation. In some embodiments, systems include a computer having a computer readable storage medium with a computer program stored thereon, where the computer program when loaded on the computer includes instructions for obtaining a first set of flow cytometer data containing a training gate and a second set of flow cytometer data, organizing the data into two-dimensional bins, creating a histogram and cumulative distribution function based on the two-dimensionally binned data, and determining an image generation value based on the cumulative distribution function. The computer may also include instructions for generating an image for each of the first and second sets of flow cytometer data by assigning a shade to each bin based on the corresponding image generation values, warping the generated image of the first set of flow cytometer data to maximize resemblance to the generated image of the second set of flow cytometer data, using B-spline coefficients from warping the generated image of the first set of flow cytometer data to adjust the training gate, and overlaying the training gate onto the generated image of the second set of flow cytometer data.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
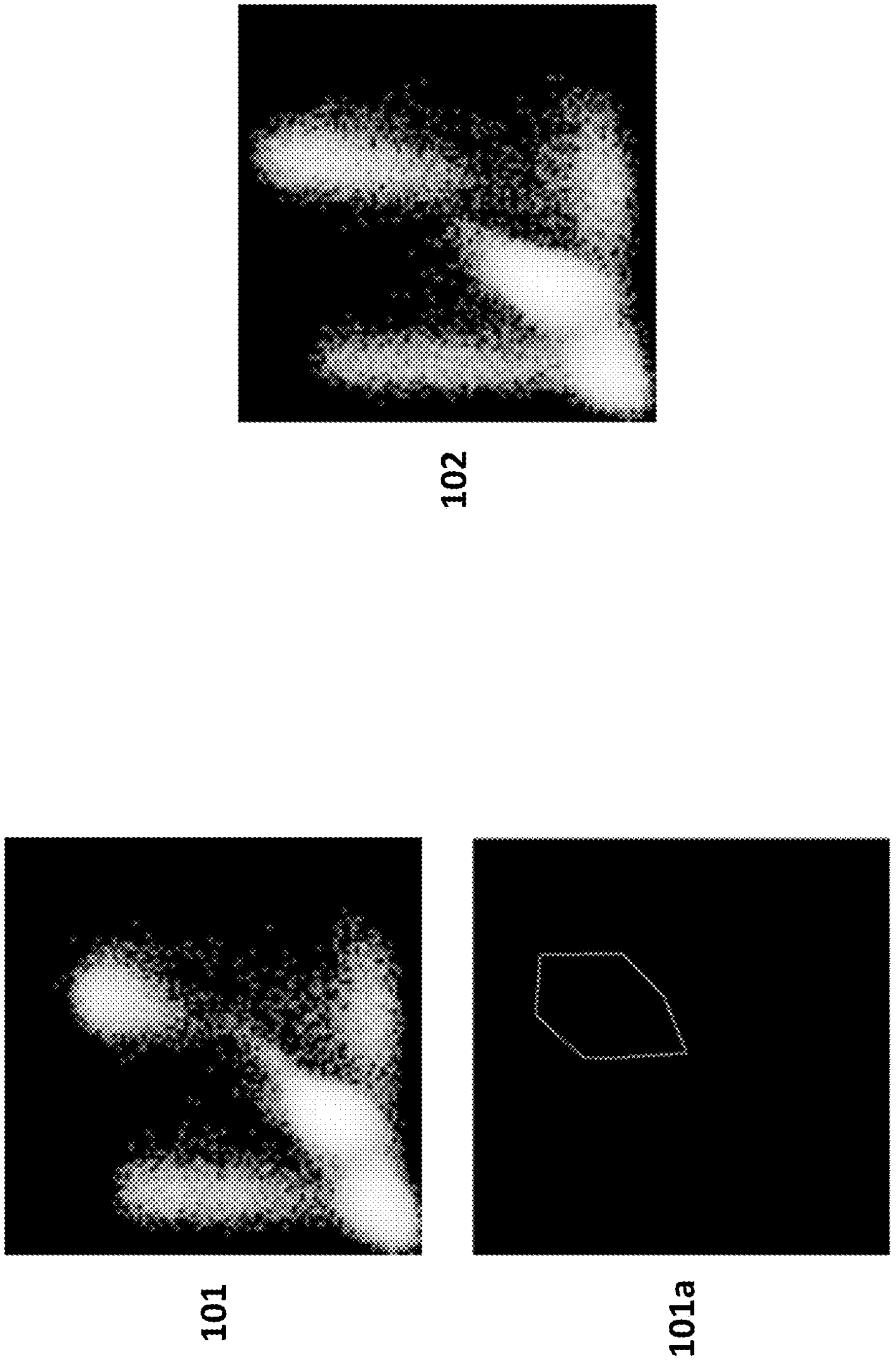
FIG. 1 depicts a generated image for a first set of flow cytometer data as well as its corresponding training gate, and a generated image for a second set of flow cytometer data.

As discussed above, methods for adjusting a training gate prepared from a first set of flow cytometer data to accommodate a second set of flow cytometer data are provided. In embodiments, methods include generating an image for each of the first and second sets of flow cytometer data. In some instances, generating an image includes organizing the data into two-dimensional bins, and assigning shades to each bin such that the bins are represented by pixels. In some instances, methods include warping with a computer implemented algorithm the generated image of the first set of flow cytometer data such that it maximizes resemblance to the second set of flow cytometer data, and applying the same transformation to the training gate. In some embodiments, methods include overlaying the adjusted training gate onto the generated image of the second set of flow cytometer data. Systems and computer-readable media for adjusting a training gate are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term “about.” The term “about” is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms “a”, “an”, and “the” include plural referents unless the context clearly dictates otherwise. It is further noted that the claims may be drafted to exclude any optional element. As such, this statement is intended to serve as antecedent basis for use of such exclusive terminology as “solely,” “only” and the like in connection with the recitation of claim elements, or use of a “negative” limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of “means” or “steps” limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods for Adjusting a Training Gate to Accommodate Flow Cytometer Data

As discussed above, aspects of the present disclosure include methods for adjusting a training gate prepared from a first set of flow cytometer data to accommodate a second set of flow cytometer data. Embodiments of the invention therefore include obtaining first and second sets of flow cytometer data. In embodiments, the first set of flow cytometer data has been characterized such that one or more populations contained therein are understood to be associated with a subtype (i.e., phenotype) of interest. In some embodiments, the first set of flow cytometer data is obtained from a previous flow cytometry experiment. As such, the first set of flow cytometer data, according to certain embodiments, contains populations that have been recognized or confirmed by the user to be associated with particular properties of interest. Conversely, a second set of flow cytometer data, according to embodiments of the invention, includes one or more populations that have not yet been defined. In other words, a population of interest within the second set of flow cytometer data requires a boundary (i.e., gate) so that it can be formally distinguished from the remaining data. In embodiments, the first and second sets of flow cytometer data contain data exhibiting the same parameters (e.g., the same fluorochromes are detected in both sets).

In embodiments, the first set of flow cytometer data includes a training gate. As used herein, a "gate" generally refers to a classifier boundary identifying a subset of data of interest. In cytometry, a gate can bound a group of events of particular interest. In addition, "gating" generally refers to the process of classifying the data using a defined gate for a given set of data, where the gate can be one or more regions of interest combined with Boolean logic. In some embodiments, a gate defines a boundary for classifying populations of flow cytometer data. In embodiments, a gate identifies flow cytometer data exhibiting the same parameters. Examples of methods for gating have been described in, for example, U.S. Pat. Nos. 4,845,653; 5,627,040; 5,739,000; 5,795,727; 5,962,238; 6,014,904; 6,944,338; and 8,990,047; each of which is incorporated herein by reference. As such, a "training gate" refers to a gate that that is known to define a particular subset of flow cytometer data. In other words, the training gate bounds a population of flow cytometer data that has previously been determined, by a user or others of skill in cytometry, to correspond to properties of interest. In embodiments, the training gate includes vertices, i.e., points on the two-dimensional plot that, when connected, form the gate. In some embodiments, the training gate is drawn by a user. In other embodiments, the training gate is pre-established by others of skill in cytometry. In embodiments, the training gate is used to define a population of interest within a first set of flow cytometer data. In embodiments, the training gate possesses a shape corresponding to the shape of the population of interest in the first set of flow cytometer data. In some embodiments, the training gate possesses a polygonal shape. Therefore, in embodiments, a user can draw a polygon on a graph of the first set of flow cytometer data measurements to define a range of data values to be included within the training gate.

In certain embodiments, methods include determining the boundaries of the training gate by generating a two-dimensional data plot that includes one or more regions that plot a population of particles, such as two or more regions, such as three or more regions, such as four or more regions and including five or more regions. In some embodiments, a bitmap of each region in the data plot is generated, which according to certain embodiments is used as a gate for that corresponding region. In some embodiments, the boundaries of each region in the data plot are determined. In some instances, to determine the boundary of a region of the data plot, methods include calculating a set of vertices that form the boundary for each region in the data plot by determining the minimum value and maximum value along each axis of the data plot for each vertex. In these embodiments, the minimum value along the x-axis and the minimum value along the y-axis as well as the maximum value along the x-axis and the maximum value along the y-axis are determined for each vertex.

In some embodiments, an algorithmic transformation that is associated with the vertices of each region of the data plot is determined. Depending on the type of data plot employed (e.g., a biexponential data plot), the algorithmic transformation identified for each vertex of the data plot may vary, such as being a linear numerical transformation, a logarithmic numerical transformation or a biexponential numerical transformation. The transformation may be positive or negative depending on the particle population position on the data plot. For example, the transformation may be a positive linear, positive logarithmic, negative linear or negative logarithmic transformation. In some embodiments, the identified algorithmic transformation is a positive linear/positive linear transformation (i.e., a linear transformation along the positive x-axis and a linear transformation along the positive y-axis) In other embodiments, the identified algorithmic transformation is a positive logarithmic/positive logarithmic transformation. In other embodiments, the algorithmic transformation is a positive linear/positive logarithmic transformation. In other embodiments, the algorithmic transformation is a positive logarithmic/positive linear transformation. In other embodiments, the algorithmic transformation is a negative linear/negative logarithmic transformation. In other embodiments, the algorithmic transformation is a negative linear/positive logarithmic transformation. In other embodiments, the algorithmic transformation is a positive logarithmic/negative linear transformation.

A bitmap may be generated for each particle population region in the data plot. The term bitmap is used herein in its conventional sense to refer to a mapping index of a region of the data plot. Bitmaps as described herein may be generated in the form of data or as a graphical display. In some embodiments, bitmaps are formed from a single tile. In other embodiments, bitmaps are formed from more than one tile. In some embodiments, two or more bitmap tiles are generated from the data plot, such as 3 or more bitmap tiles, such as 4 or more bitmap tiles, such as 5 or more bitmap tiles, such as 6 or more bitmap tiles, such as 7 or more bitmap tiles, such as 8 or more bitmap tiles and including 9 or more bitmap tiles. Each bitmap tile may include one or more vertices of the boundaries from each region of the particle population of interest, such as 2 or more vertices, such as 3 or more vertices, such as 4 or more vertices and including 5 or more vertices of each region of the particle population of interest.

In certain instances, an algorithmic transformation is identified for applying to each vertex in the bitmap. Depending on the type of data plot employed (e.g., a biexponential data plot), the algorithmic transformation identified for each vertex of the bitmap may vary, such as being a linear numerical transformation, a logarithmic numerical transformation or a biexponential numerical transformation. The transformation may be positive or negative depending on the particle population position on the data plot. In some embodiments, when the algorithmic transformation associated with a vertex in the data plot is linear, the method includes identifying a linear transformation for applying to the corresponding vertex in the bitmap. In other embodiments, when the algorithmic transformation associated with a vertex in the data plot is logarithmic, the method includes identifying a logarithmic transformation for applying to the corresponding vertex in the bitmap. In other embodiments, when the algorithmic transformation associated with a vertex in the data plot is biexponential, the method includes identifying a transformation for applying to the corresponding vertex in the bitmap that includes a symmetric logarithmic transformation, a linear transformation or a combination thereof. In one example, where the algorithmic transformation associated with a vertex in the data plot is positive linear/positive linear, the method includes identifying an algorithmic transformation for applying to the corresponding vertex in the bitmap that is positive linear/positive linear. In another example, where the algorithmic transformation associated with a vertex in the data plot is positive logarithmic/positive logarithmic, the method includes identifying an algorithmic transformation for applying to the corresponding vertex in the bitmap that is positive linear/positive linear. In another example, where the algorithmic transformation associated with a vertex in the data plot is positive linear/positive logarithmic, the method includes identifying an algorithmic transformation for applying to the corresponding vertex in the bitmap that is positive linear/positive logarithmic. In another example, where the algorithmic transformation associated with a vertex in the data plot is positive logarithmic/positive linear, the method includes identifying an algorithmic transformation for applying to the corresponding vertex in the bitmap that is positive logarithmic/positive linear. In another example, where the algorithmic transformation associated with a vertex in the data plot is negative logarithmic/positive linear, the method includes identifying an algorithmic transformation for applying to the corresponding vertex in the bitmap that is negative logarithmic/positive linear. In another example, where the algorithmic transformation associated with a vertex in the data plot is positive logarithmic/negative linear, the method includes identifying an algorithmic transformation for applying to the corresponding vertex in the bitmap that is positive logarithmic/negative linear. In another example, where the algorithmic transformation associated with a vertex in the data plot is negative linear/positive logarithmic, the method includes identifying an algorithmic transformation for applying to the corresponding vertex in the bitmap that is negative linear/positive logarithmic. In another example, where the algorithmic transformation associated with a vertex in the data plot is positive linear/negative logarithmic, the method includes identifying an algorithmic transformation for applying to the corresponding vertex in the bitmap that is positive linear/negative logarithmic. In another example, where the algorithmic transformation associated with a vertex in the data plot is negative linear/negative linear, the method includes identifying an algorithmic transformation for applying to the corresponding vertex in the bitmap that is negative linear/negative linear. In another example, where the algorithmic transformation associated with a vertex in the data plot is negative logarithmic/negative logarithmic, the method includes identifying an algorithmic transformation for applying to the corresponding vertex in the bitmap that is negative linear/negative linear.

In some embodiments, methods include aligning the algorithmic transformations applied to the bitmap. In these embodiments, the transformations are aligned so that overlap is minimized and that the transform switches appropriately. In certain embodiments, methods include performing an affine transformation of the bitmaps, adjust the affine transformation so that the use of the bitmaps is maximized, i.e. the bitmap boundaries align with the region bounding box. In these embodiments, if the span across a bitmap in ADC channels is less than the bitmap resolution, a switch of the transformation to linear for that section may be performed to maximize fidelity. The bitmap may be rendered by interpolating one or more line segments between two vertices. In some instances, the bitmap may be generated with a polygon drawing algorithm, such as a polygon scanline fill algorithm.

In certain embodiments, a two-dimensional data plot that includes one or more regions having a population of particles is generated as described in U.S. Pat. No. 10,613,017, the disclosure of which is herein incorporated by reference.

By "flow cytometer data" it is meant information regarding parameters of a sample (e.g., cells, particles) in a flow cell that is collected by any number of light detectors in a particle analyzer. In embodiments, the flow cytometer data is received from a forward scatter detector. A forward scatter detector may, in some instances, yield information regarding the overall size of a particle. In embodiments, the flow cytometer data is received from a side scatter detector. A side scatter detector may, in some instances, be configured to detect refracted and reflected light from the surfaces and internal structures of the particle, which tends to increase with increasing particle complexity of structure. In embodiments, the flow cytometer data is received from a fluorescent light detector. A fluorescent light detector may, in some instances, be configured to detect fluorescence emissions from fluorescent molecules, e.g., labeled specific binding members (such as labeled antibodies that specifically bind to markers of interest) associated with the particle in the flow cell. In certain embodiments, methods include detecting fluorescence from the sample with one or more fluorescence detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescence detectors.

The data obtained from an analysis of cells (or other particles) by flow cytometry are often multidimensional, where each cell corresponds to a point in a multidimensional space defined by the parameters measured. Populations of cells or particles can be identified as clusters of points in the data space. In some embodiments, methods include generating one or more population clusters based on the determined parameters of analytes (e.g., cells, particles) in the sample. As used herein, a "population", or "subpopulation" of analytes, such as cells or other particles, generally refers to a group of analytes that possess properties (for example, optical, impedance, or temporal properties) with respect to one or more measured parameters such that measured parameter data form a cluster in the data space. In embodiments, data is comprised of signals from a plurality of different parameters, such as, for instance 2 or more, 3 or more, 4 or more, 5 or more, 6 or more, 7 or more, 8 or more, 9 or more, 10 or more, and including 20 or more. Thus, populations are recognized as clusters in the data. Conversely, each data cluster generally is interpreted as corresponding to a population of a particular type of cell or analyte, although clusters that correspond to noise or background typically also are observed. A cluster may be defined in a subset of the dimensions, e.g., with respect to a subset of the measured parameters, which corresponds to populations that differ in only a subset of the measured parameters or features extracted from the measurements of the cell or particle.

In embodiments, methods include receiving flow cytometer data, calculating parameters of each analyte, and clustering together analytes based on the calculated parameters. For example, an experiment may include particles labeled by several fluorophores or fluorescently labeled antibodies, and groups of particles may be defined by populations corresponding to one or more fluorescent measurements. In the example, a first group may be defined by a certain range of light scattering for a first fluorophore, and a second group may be defined by a certain range of light scattering for a second fluorophore. If the first and second fluorophores are represented on an x and y axis, respectively, two different color-coded populations might appear to define each group of particles, if the information was to be graphically displayed. Any number of analytes may be assigned to a cluster, including 5 or more analytes, such as 10 or more analytes, such as 50 or more analytes, such as 100 or more analytes, such as 500 analytes and including 1000 analytes. In certain embodiments, the method groups together in a cluster rare events (e.g., rare cells in a sample, such as cancer cells) detected in the sample. In these embodiments, the analyte clusters generated may include 10 or fewer assigned analytes, such as 9 or fewer and including 5 or fewer assigned analytes.

After flow cytometer data has been obtained, aspects of the invention additionally include generating an image for each of the first and second sets of flow cytometer data (i.e., a distinct image for each set of flow cytometer data). By "generating an image" it is meant converting a two-dimensional plot into image format such that flow cytometer data is represented by pixels that, when assembled, constitute an image representative of the data. In embodiments, generating an image for each of the first and second sets of flow cytometer data involves organizing the data into two-dimensional bins. In the present disclosure, the term "bin" is used in its conventional sense to refer to a data structure into which data points falling within a certain interval are combined. The bin is subsequently assigned a value representative of that interval. In embodiments, the representative value for a bin is the average value of the flow cytometer data contained within said bin. As such, in embodiments, individual data points within a defined region of the two-dimensional scatterplot are collated into a bin, and that bin is associated with a representative value that reflects the number of data points contained therein.

In some embodiments, flow cytometer data is binned according to the status of the data relative to a parameter. In such embodiments, the representative value of a given bin may be the average value of the binned data with respect to the detected intensity for said parameter. For example, where the parameter is a fluorescence parameter, the representative value for a particular bin may be the average value of the data within that bin with respect to the intensity of fluorescent light emitting from a given fluorochrome. In embodiments, data is binned according to the status of the data relative to one or more additional parameters. In such embodiments, the representative value for a given bin may be a composite of the average values evaluated with respect to each relevant parameter. Accordingly, in embodiments, combining flow cytometer data into bins includes evaluating the data with respect to 1 or more additional parameters, such as 2 or more, 3 or more, 4 or more, 5 or more, 10 or more, 15 or more and including 20 or more additional parameters.

After flow cytometer data is organized into bins, aspects of the invention include determining an image generation value. As discussed herein, an image generation value quantifies data point concentration within a given bin and serves as the basis for generating an image. In certain embodiments, determining the image generation value includes creating a histogram of the two-dimensionally binned data (i.e., a histogram of the representative values associated with each bin). In such embodiments, determining the image generation value also includes calculating a cumulative distribution function based on the histogram. A cumulative distribution function is referred to in its conventional sense and determines the probability that a variable is less than or equal to a certain amount. As such, the representative value for each bin is entered into the cumulative distribution function calculated from the histogram to obtain the image generation value. In some embodiments, the image generation value ranges from 0 to 1. In other embodiments, the image generation value may be scaled to range from 0 to any number selected by the user. In embodiments, a higher image generation value indicates that the relevant bin is associated with more data points, while a lower image generation value indicates that the relevant bin is associated with fewer data points.

Following the determination of the image generation value, embodiments of the invention include assigning a shade to each bin based on the image generation value corresponding to that bin. A "shade" described herein refers to the lightness or darkness with which a given bin will be represented in a resulting image. In some embodiments, bins are assigned shades of grey. In such embodiments, the resulting image is a greyscale image. In other embodiments, bins are assigned shades of a non-grey color. In such embodiments, the resulting image is a color image. In embodiments where data combined into bins are evaluated with respect to multiple parameters, an image generated from such bins may be multicolor. In such embodiments, a different color may be associated with each distinct parameter. In some embodiments, bins associated with a higher image generation value are assigned a lighter color, while bins associated with a lower image generation value are assigned a darker color. Certain embodiments of the invention also include an image generation threshold. In such embodiments, all bins associated with image generation values under the threshold are assigned black. In some embodiments, the threshold is adjustable (i.e., selected from a number of different options by the user). As such, more or less of the image may be assigned black based on the magnitude of the chosen threshold.

FIG. 1 depicts an image of a first set of flow cytometer data 101 generated by the process described above, as well as a corresponding training gate 101*a* for defining a population of interest within the first set of flow cytometer data 101. On the other hand, the generated image for a second set of flow cytometer data 102 does not include a gate bounding a similar population of flow cytometer data.

Aspects of the invention further include adjusting the training gate from the generated image of the first set of flow cytometer data to accommodate the generated image of the second set of flow cytometer data. By adjusting the training gate to "accommodate" the second set of flow cytometer data, it is meant altering the shape of the training gate such that the adjusted training gate accounts for differences in population morphology present in the second set of flow cytometer data compared to the first set of flow cytometer data. In certain embodiments, adjustment of the training gate includes adjusting one or more of, up to each of, the training gate's constitutive vertices. In embodiments, adjustment of the training gate is performed by a processor implemented algorithm. In embodiments of such instances, the processor implemented algorithm may be configured to warp the vertices of the training gate taken from the generated image of the first set of flow cytometer data to fit the generated image of the second set of flow cytometer data. According to embodiments of the disclosure, the processor implemented algorithm is an image registration algorithm. An image registration algorithm integrates and transforms data received from an image. As such, the image registration algorithm described herein analyzes the generated image of the first set of flow cytometer data, analyzes the generated image of the second set of flow cytometer data, and warps the training gate from the first set of flow cytometer data to fit the second set of flow cytometer data based on those analyses.

Figure 2:
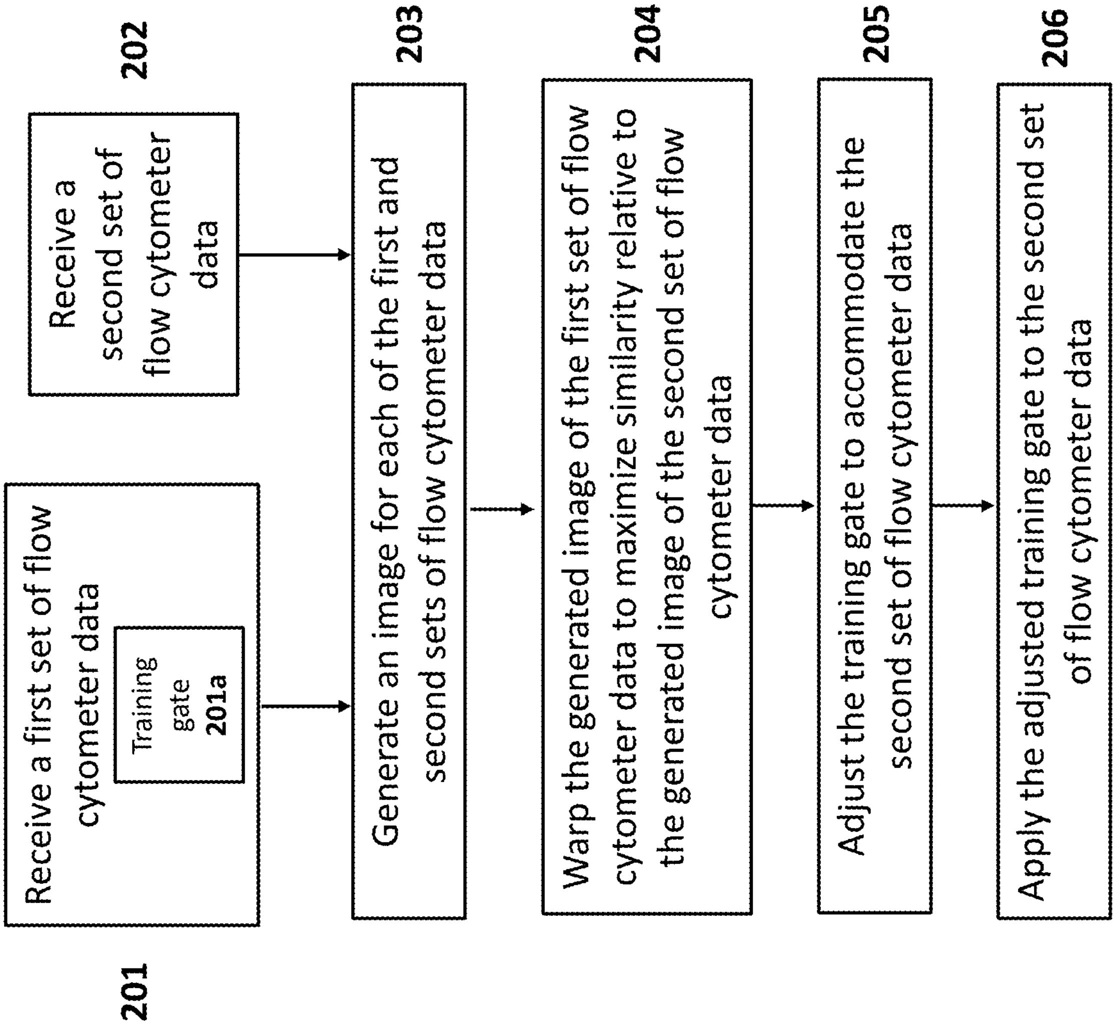
FIG. 2 depicts a flowchart for automatically adjusting a training gate from a first set of flow cytometer data to accommodate a second set of flow cytometer data according to certain embodiments.

In embodiments, warping the training gate to fit the second set of flow cytometer data includes warping the entire generated image of the first set of flow cytometer data to maximize resemblance relative to the generated image of the second set of flow cytometer data. In such embodiments, the population of interest within the generated image of the first set of flow cytometer data is adjusted (i.e., warped) such that the contours of said population are approximately identical to the contours of the analogous population within the generated image of the second set of flow cytometer data. In other words, the processor implemented algorithm may include a mathematical deformation model configured to transform/deform the first set of flow cytometer data to resemble the second set of flow cytometer data. After the generated image of the first set of flow cytometer data is warped, the training gate contained therein may be correspondingly warped. For example, FIG. 2 depicts a sample workflow according to certain embodiments of the invention. In steps 201 and 202, first and second sets of flow cytometer data are obtained. The first set of flow cytometer data includes a training gate 201*a*. In step 203, an image is generated for each of the first and second sets of flow cytometer data (e.g., as described above). Subsequently, the generated image of the first set of flow cytometer data is warped such that the population of interest resembles the analogous population in the generated image of the second set of flow cytometer data (step 204). The training gate contained within the first set of flow cytometer data can subsequently be warped in step 205 by the same transformation used in step 204. The vertices of the gate transformed in step 205 can then be applied to the generated image of the second set of flow cytometer data in step 206. In some embodiments, before the training gate is adjusted, it is first imposed onto a blank image (i.e., such that the training gate is the only element in the image). In other words, the training gate may be isolated from the remainder of the generated image of the first set of flow cytometer data, and imposed onto a separate image.

Figure 3:
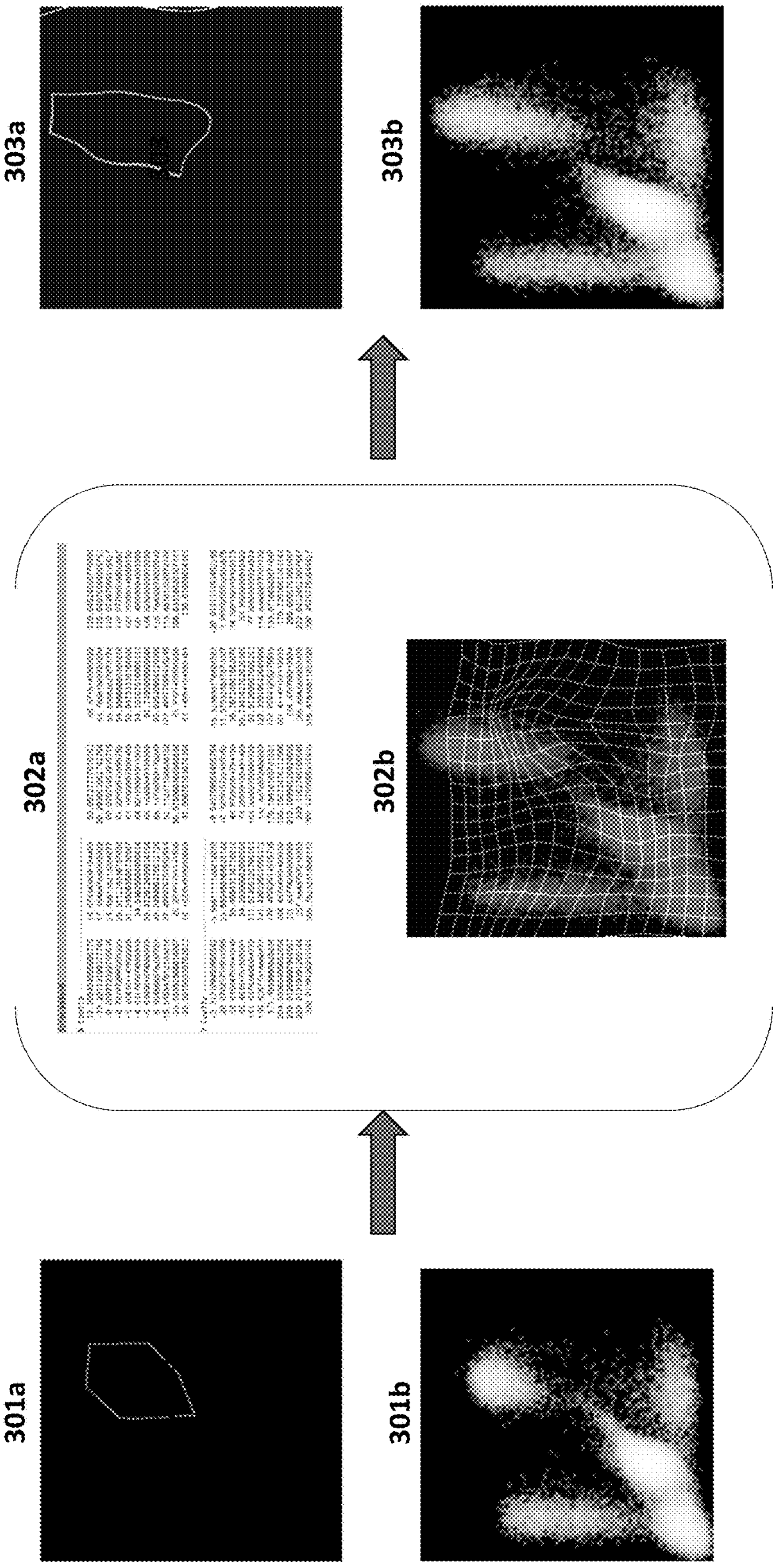
FIG. 3 depicts adjusting a training gate to accommodate the generated image of the second set of flow cytometer data.

In some embodiments, the image registration algorithm configured to warp the generated image of the first set of flow cytometer data includes B-spline warping. B-spline (i.e., basis spline) describes a mathematical function often used for curve-fitting. B-splines are described in, for example, Gans, P., & Gill, J. B. (1984). Smoothing and differentiation of spectroscopic curves using spline functions. *Applied spectroscopy,* 38 (3), 370-376.; the disclosure of which is incorporated by reference. In embodiments, B-spline warping includes computing B-spline coefficients, which are then used to define a function for adjusting the training gate. In other words, the image registration algorithm warps the generated image of the first set of flow cytometer data and outputs B-spline coefficients that numerically describe how the generated image of the first set of flow cytometer data was warped. These coefficients then serve as the basis for updating the vertices of the training gate such that an adjusted training gate accounting for the differences between the first and second sets of flow cytometer data is produced. Updated (i.e., adjusted) vertices can then be applied to the generated image of the second set of flow cytometer data in order to form the adjusted gate thereon. For example, FIG. 3 depicts the process of adjusting a first set of flow cytometer data and its corresponding training gate according to certain embodiments. Image 301*a* depicts a training gate imposed on a blank image, and image 301*b* depicts the corresponding generated image of the first set of flow cytometer data. As image 301*b* is warped into adjusted image 303*b* by the processor implemented algorithm in order to maximize resemblance to the generated image of the second set of flow cytometer data (102 shown in FIG. 1), a set of B-spline coefficients 302*a* are employed and recorded. Warping of image 301*b* is depicted by the deformation 302*b*. The same B-spline coefficients 302*a* used to warp image 301*b* into image 303*b* are then used to define a function to warp the training gate imposed on blank image 301*a* and create adjusted training gate 303*a*.

Figure 4:
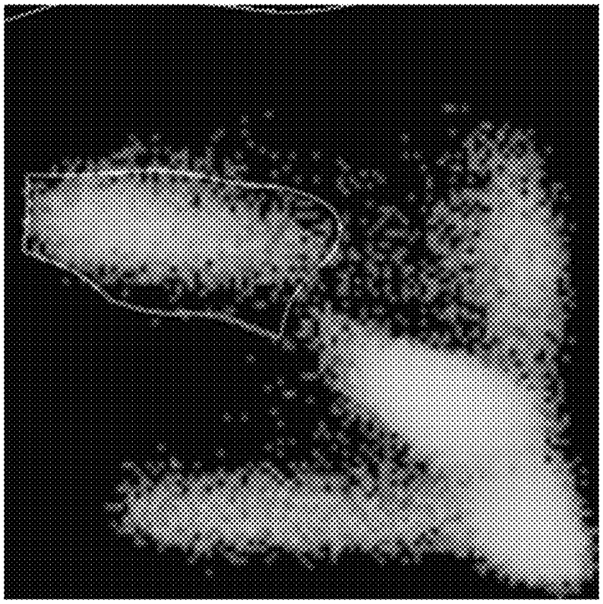
FIG. 4 depicts an adjusted training gate.

Following adjustment of the training gate, aspects of the invention include overlaying the adjusted training gate onto the second set of flow cytometer data. In such embodiments, vertices of the adjusted training gate within the blank image are applied to the corresponding population in the generated image of the second set of flow cytometer data to form a gate around that population. For example, image 400 shown in FIG. 4 depicts an adjusted training gate overlaid onto the second set of flow cytometer data 102. In some embodiments, adjusting the vertices of the training gate to create an adjusted training gate includes extracting the vertices from the training gate (i.e., isolating and observing the positions of each vertex), altering the positions of each vertex based on B-spline coefficients (e.g., as determined above), and applying the adjusted vertices to the generated image of the second set of flow cytometer data to form the adjusted training gate. In other embodiments, the processor implemented algorithm may warp the training gate before observing the position of each vertex. In such embodiments, the processor implemented algorithm adjusts the training gate by means of the image registration algorithm (e.g., as discussed above), and then the adjusted vertices may be observed and applied to the generated image of the second set of flow cytometer data.

In some embodiments, the adjusted training gate overlaid onto the second set of flow cytometer data possesses a different shape than the original training gate, i.e., in order to accommodate the shape of the relevant population within the second set of flow cytometer data. In some instances, the relevant population within the second set of flow cytometer data is modulated, e.g., stretched, shrunk or shifted, in some regions when compared to the population in the first set of flow cytometer data. As such, in some instances, the adjusted training gate is shaped such that it accommodates these differences. In some instances, the adjusted training gate is a polygon.

Figure 5:
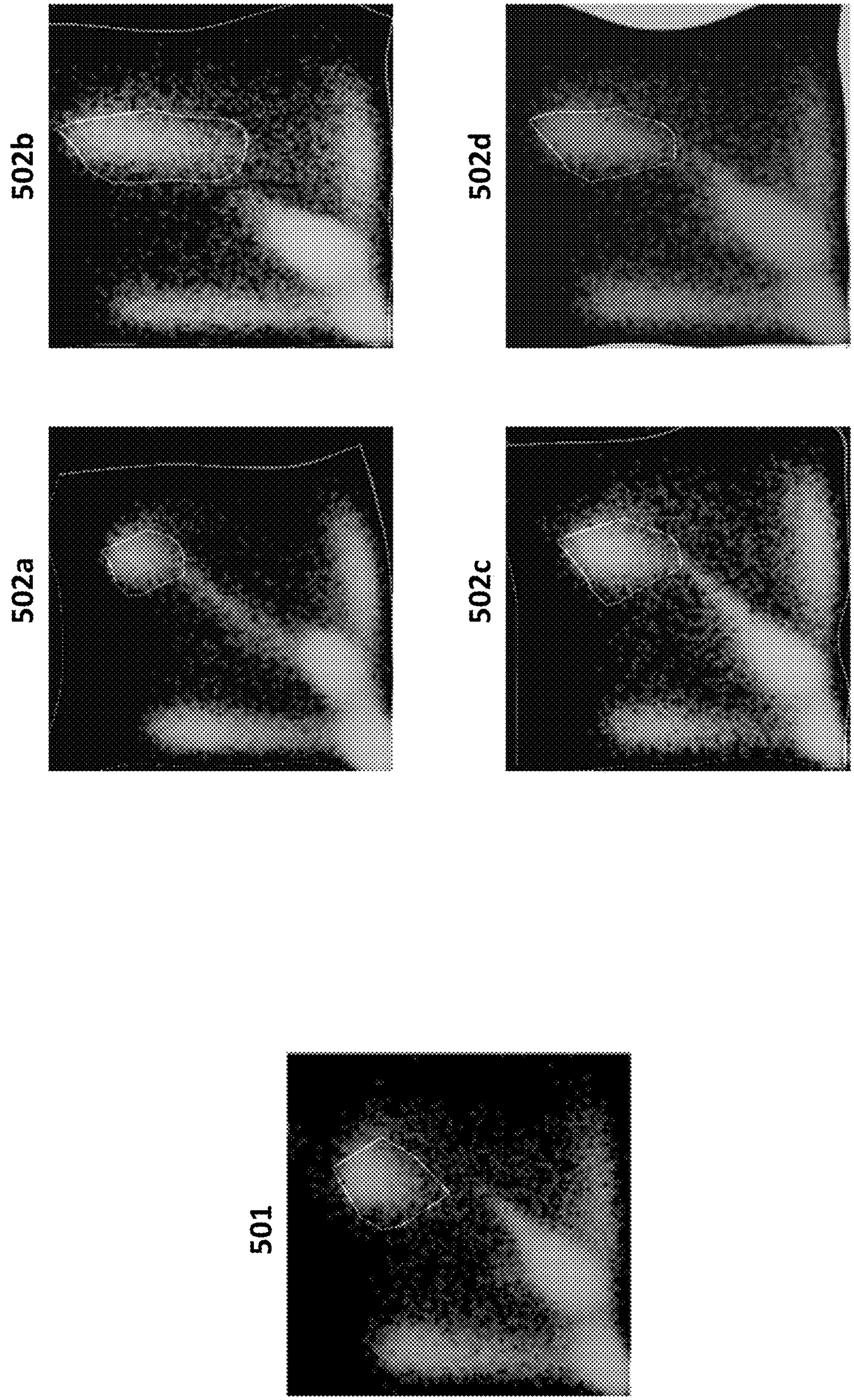
FIG. 5 depicts examples of training gates that have been adjusted to accommodate various second sets of flow cytometer data.
Figure 6:
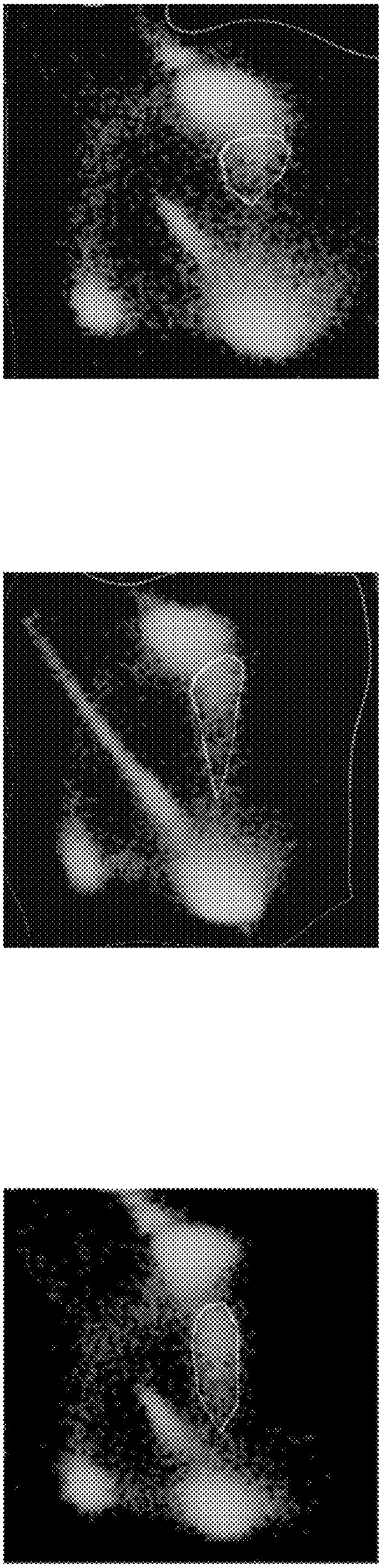
FIG. 6 depicts additional examples of training gates that have been adjusted to accommodate various second sets of flow cytometer data.

FIG. 5 and FIG. 6 depict training gates that have been adjusted by the above-described process. FIG. 5 depicts a first set of flow cytometer data 501 containing a training gate. 502*a*-502*d* depict second sets of flow cytometer data, each containing a gate that has been adjusted from image 501 by the instant method. Similarly, FIG. 6 depicts a first set of flow cytometer data 601 containing a training gate. 602*a* and 602*b* depict second sets of flow cytometer data, each containing a gate that has been adjusted from image 601 by the instant method.

In order to produce flow cytometer data according to the present disclosure, a sample having particles is irradiated with a light source and light from the sample is detected to generate populations of related particles based at least in part on the measurements of the detected light. In some instances, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample having particles (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods include irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

Aspects of the present invention include collecting light with a detector, or combination of detectors. In some embodiments, light is collected by one or more side-scatter detectors configured to detect side-scatter light. In additional embodiments, light is collected by one or more forward scatter detectors configured to detect forward scattered light. In further embodiments, light is collected by one or more fluorescent light detectors configured to detect fluorescent light. A fluorescent light detector may, in some instances, be configured to detect fluorescence emissions from fluorescent molecules, e.g., labeled specific binding members (such as labeled antibodies that specifically bind to markers of interest) associated with the particle in the flow cell. In certain embodiments, methods include detecting fluorescence from the sample with one or more fluorescent light detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescent light detectors. In embodiments, each of the fluorescent light detectors is configured to generate a fluorescence data signal. Fluorescence from the sample may be detected by each fluorescent light detector, independently, over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence with each fluorescence detector at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescent light detectors in the subject light detection system. In certain embodiments, methods include detecting wavelengths of light which correspond to the fluorescence peak wavelength of certain fluorochromes present in the sample. In embodiments, flow cytometer data is received from one or more fluorescent light detectors (e.g., one or more detection channels), such as 2 or more, such as 3 or more, such as 4 or more, such as 5 or more, such as 6 or more and including 8 or more fluorescent light detectors (e.g., 8 or more detection channels).

Systems for Adjusting a Training Gate to Accommodate Flow Cytometer Data

Aspects of the present disclosure also include systems for adjusting a training gate prepared from a first set of flow cytometer data to accommodate a second set of flow cytometer data. In some embodiments, systems include an input module configured to obtain a first set of flow cytometer data, a particle analyzer configured to obtain a second set of flow cytometer data, and a processor configured to analyze the flow cytometer data.

In some embodiments, the subject particle analyzers have a flow cell, and a laser configured to irradiate particles in the flow cell. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg)

laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:$YVO_4$ laser, Nd:$YCa_4O(BO_3)_3$ laser, Nd:YCOB laser, titanium sapphire laser, thulium YAG laser, ytterbium YAG laser, ytterbium$_2O_3$ laser or cerium doped lasers and combinations thereof.

In certain embodiments, the subject particle analyzers include a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCI) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulium YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In some embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

Aspects of the invention also include a forward scatter detector configured to detect forward scattered light. The number of forward scatter detectors in the subject flow cytometers may vary, as desired. For example, the subject particle analyzers may include 1 forward scatter detector or multiple forward scatter detectors, such as 2 or more, such as 3 or more, such as 4 or more, and including 5 or more. In certain embodiments, flow cytometers include 1 forward scatter detector. In other embodiments, flow cytometers include 2 forward scatter detectors.

Any convenient detector for detecting collected light may be used in the forward scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple forward scatter detectors, each detector may be the same, or the collection of detectors may be a combination of different types of detectors. For example, where the subject particle analyzers include two forward scatter detectors, in some embodiments the first forward scatter detector is a CCD-type device and the second forward scatter detector (or imaging sensor) is a CMOS-type device. In other embodiments, both the first and second forward scatter detectors are CCD-type devices. In yet other embodiments, both the first and second forward scatter detectors are CMOS-type devices. In still other embodiments, the first forward scatter detector is a CCD-type device and the second forward scatter detector is a photomultiplier tube (PMT). In still other embodiments, the first forward scatter detector is a CMOS-type device and the second forward scatter detector is a photomultiplier tube. In yet other embodiments, both the first and second forward scatter detectors are photomultiplier tubes.

In embodiments, the forward scatter detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Embodiments of the invention also include a light dispersion/separator module positioned between the flow cell and the forward scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the flow cell and the forward scatter detector. In other embodiments, more than one bandpass filter is positioned between the flow cell and the forward scatter detector, such as, for example, 2 or more, 3 or more, 4 or more, and including 5 or more. In embodiments, the bandpass filters have a minimum bandwidth ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. wavelengths and reflects light with other wavelengths to the forward scatter detector.

Certain embodiments of the invention include a side scatter detector configured to detect side scatter wavelengths of light (e.g., light refracted and reflected from the surfaces and internal structures of the particle). In other embodiments, flow cytometers include multiple side scatter detectors, such as 2 or more, such as 3 or more, such as 4 or more, and including 5 or more.

Any convenient detector for detecting collected light may be used in the side scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple side scatter detectors, each side scatter detector may be the same, or the collection of side scatter detectors may be a combination of different types of detectors. For example, where the subject particle analyzers include two side scatter detectors, in some embodiments the first side scatter detector is a CCD-type device and the second side scatter detector (or imaging sensor) is a CMOS-type device. In other embodiments, both the first and second side scatter detectors are CCD-type devices. In yet other embodiments, both the first and second side scatter detectors are CMOS-type devices. In still other embodiments, the first side scatter detector is a CCD-type device and the second side scatter detector is a photomultiplier tube (PMT). In still other embodiments, the first side scatter detector is a CMOS-type device and the second side scatter detector is a photomultiplier tube. In yet other embodiments, both the first and second side scatter detectors are photomultiplier tubes.

Embodiments of the invention also include a light dispersion/separator module positioned between the flow cell and the side scatter detector. Light dispersion devices of interest include but are not limited to, colored glass, bandpass filters, interference filters, dichroic mirrors, diffraction gratings, monochromators and combinations thereof, among other wavelength separating devices.

In embodiments, the subject particle analyzers also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the flow cell and the fluorescent light detector. Light dispersion devices of interest include but are not limited to, colored glass, bandpass filters, interference filters, dichroic mirrors, diffraction gratings, monochromators and combinations thereof, among other wavelength separating devices.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem. January;* 49 (pt 1): 17-28; Linden, et. al., *Semin Throm Hemost.* 2004 October; 30 (5): 502-11; Alison, et al. J Pathol, 2010 December; 222 (4): 335-344; and Herbig, et al. (2007) *Crit Rev Ther Drug Carrier Syst.* 24 (3): 203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7 (10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In certain embodiments, the subject systems additionally include a processor having memory operably coupled to the processor wherein the memory includes instructions stored thereon, which when executed by the processor, cause the processor to adjust a training gate prepared from a first set of flow cytometer data to accommodate a second set of flow cytometer data. Embodiments of the invention therefore include obtaining first and second sets of flow cytometer data. The first set of flow cytometer data has been characterized such that one or more populations contained therein are understood to be associated with a subtype (i.e., phenotype) of interest. In embodiments, the first set of flow cytometer data is obtained from an input module. The input module may be any convenient device in communication with the processor that is configured to provide the processor with a first set of flow cytometer data. In embodiments, the input module possesses memory coupled thereto for storing flow cytometer data which may be recalled by the processor when it is required for adjusting a training gate. In some embodiments, the first set of flow cytometer data is obtained from a previous flow cytometry experiment. As such, the first set of flow cytometer data, according to certain embodiments, contains populations that have been recognized or confirmed by the user to be associated with particular properties of interest. Conversely, a second set of flow cytometer data, according to embodiments of the invention, includes one or more populations that have not yet been defined. In other words, a population of interest within the second set of flow cytometer data requires a boundary (i.e., gate) so that it can be formally distinguished from the remaining data. In embodiments, the first and second sets of flow cytometer data contain data exhibiting the same parameters (e.g., the same fluorochromes are detected in both sets). In embodiments, the second set of flow cytometer data is obtained from a particle analyzer, such as those described above.

In embodiments, the first set of flow cytometer data obtained from the input module includes a training gate. The training gate bounds a population of flow cytometer data that has previously been determined, by a user or others of skill in cytometry, to correspond to properties of interest. In embodiments, the training gate includes vertices, i.e., points on the two-dimensional plot that, when connected, form the gate. In some embodiments, the training gate is drawn by a user. In other embodiments, the training gate is pre-established by others of skill in cytometry. In embodiments, the training gate is used to define a population of interest within a first set of flow cytometer data. In embodiments, the training gate possesses a shape corresponding to the shape of the population of interest in the first set of flow cytometer data. In some embodiments, the training gate possesses a polygonal shape. Therefore, in embodiments, a user can draw a polygon on a graph of the first set of flow cytometer data measurements to define a range of data values to be included within the training gate.

The data obtained from an analysis of cells (or other particles) by flow cytometry are often multidimensional, where each cell corresponds to a point in a multidimensional space defined by the parameters measured. Populations of cells or particles can be identified as clusters of points in the data space. In some embodiments, methods include generating one or more population clusters based on the determined parameters of analytes (e.g., cells, particles) in the sample. As used herein, a "population", or "subpopulation" of analytes, such as cells or other particles, generally refers to a group of analytes that possess properties (for example, optical, impedance, or temporal properties) with respect to one or more measured parameters such that measured parameter data form a cluster in the data space. In embodiments, data is comprised of signals from a plurality of different parameters, such as, for instance 2 or more, 3 or more, 4 or more, 5 or more, 6 or more, 7 or more, 8 or more, 9 or more, 10 or more, and including 20 or more. Thus, populations are recognized as clusters in the data. Conversely, each data cluster generally is interpreted as corresponding to a population of a particular type of cell or analyte, although clusters that correspond to noise or background typically also are observed. A cluster may be defined in a subset of the dimensions, e.g., with respect to a subset of the measured parameters, which corresponds to populations that differ in only a subset of the measured parameters or features extracted from the measurements of the cell or particle.

In embodiments, the processor is configured to receive flow cytometer data, calculate parameters of each analyte, and cluster together analytes based on the calculated parameters. Any number of analytes may be assigned to a cluster, including 5 or more analytes, such as 10 or more analytes, such as 50 or more analytes, such as 100 or more analytes, such as 500 analytes and including 1000 analytes. In certain embodiments, the method groups together in a cluster rare events (e.g., rare cells in a sample, such as cancer cells) detected in the sample. In these embodiments, the analyte clusters generated may include 10 or fewer assigned analytes, such as 9 or fewer and including 5 or fewer assigned analytes.

After flow cytometer data has been obtained, the processor may be configured to generate an image for each of the first and second sets of flow cytometer data (i.e., a distinct image for each set of flow cytometer data). By "generating an image" it is meant converting a two-dimensional plot into image format such that flow cytometer data is represented by pixels that, when assembled, constitute an image representative of the data. In embodiments, generating an image for each of the first and second sets of flow cytometer data involves organizing the data into two-dimensional bins. In the present disclosure, the term "bin" is used in its conventional sense to refer to a data structure into which data points falling within a certain interval are combined. The bin is subsequently assigned a value representative of that interval. In embodiments, the representative value for a bin is the average value of the flow cytometer data contained within said bin. As such, in embodiments, individual data points within a defined region of the two-dimensional scatterplot are collated into a bin, and that bin is associated with a representative value that reflects the number of data points contained therein.

In some embodiments, the processor is configured to organize flow cytometer data into bins according to the status of the data relative to a parameter. In such embodiments, the representative value of a given bin may be the average value of the binned data with respect to the detected intensity for said parameter. For example, where the parameter is a fluorescence parameter, the representative value for a particular bin may be the average value of the data within that bin with respect to the intensity of fluorescent light emitting from a given fluorochrome. In embodiments, data is binned according to the status of the data relative to one or more additional parameters. In such embodiments, the representative value for a given bin may be a composite of the average values evaluated with respect to each relevant parameter. Accordingly, in embodiments, combining flow cytometer data into bins includes evaluating the data with respect to 1 or more additional parameters, such as 2 or more, 3 or more, 4 or more, 5 or more, 10 or more, 15 or more and including 20 or more.

After flow cytometer data is organized into bins, the processor may be configured to create an image generation value. As discussed herein, an image generation value quantifies data point concentration within a given bin and serves as the basis for generating an image. In certain embodiments, determining the image generation value includes creating a histogram of the two-dimensionally binned data (i.e., a histogram of the representative values associated with each bin). In such embodiments, determining the image generation value also includes calculating a cumulative distribution function based on the histogram. A cumulative distribution function is referred to in its conventional sense and determines the probability that a variable is less than or equal to a certain amount. As such, the representative value for each bin is entered into the cumulative distribution function calculated from the histogram to obtain the image generation value. In some embodiments, the image generation value ranges from 0 to 1. In other embodiments, the image generation value may range from 0 to any number selected by the user. In embodiments, a higher image generation value indicates that the relevant bin is associated with more data points, while a lower image generation value indicates that the relevant bin is associated with fewer data points.

Following the determination of the image generation value, the processor may be configured to assign a shade to each bin based on the image generation value corresponding to that bin. A "shade" described herein refers to the lightness or darkness with which a given bin will be represented in a resulting image. In some embodiments, bins are assigned shades of grey. In such embodiments, the resulting image is a greyscale image. In other embodiments, bins are assigned shades of a non-grey color. In such embodiments, the resulting image is a color image. In embodiments where data combined into bins are evaluated with respect to multiple parameters, an image generated from such bins may be multicolor. In such embodiments, a different color may be associated with each distinct parameter. In some embodiments, bins associated with a higher image generation value are assigned a lighter color, while bins associated with a lower image generation value are assigned a darker color. Certain embodiments of the invention also include an image generation threshold. In such embodiments, all bins associated with image generation values under the threshold are assigned black. In some embodiments, the threshold is adjustable (i.e., selected from a number of different options by the user). As such, more or less of the image may be assigned black based on the magnitude of the chosen threshold.

The processor may be further configured to adjust the training gate from the generated image of the first set of flow cytometer data to accommodate the generated image of the second set of flow cytometer data. By adjusting the training gate to "accommodate" the second set of flow cytometer data, it is meant altering the shape of the training gate such that the adjusted training gate accounts for differences in population morphology present in the second set of flow cytometer data compared to the first set of flow cytometer data. In certain embodiments, adjustment of the training gate includes adjusting each of the training gate's constitutive vertices. In embodiments, the processor adjusts the training gate with a processor implemented algorithm. In such embodiments, the processor implemented algorithm is configured to adjust the vertices of the training gate taken from the generated image of the first set of flow cytometer data to fit the generated image of the second set of flow cytometer data. According to embodiments of the disclosure, the processor implemented algorithm is an image registration algorithm. An image registration algorithm integrates and transforms data received from an image. As such, the image registration algorithm described herein analyzes the generated image of the first set of flow cytometer data, analyzes the generated image of the second set of flow cytometer data, and warps the training gate from the first set of flow cytometer data to fit the second set of flow cytometer data based on those analyses.

In embodiments, warping the training gate to fit the second set of flow cytometer data involves warping the entire generated image of the first set of flow cytometer data to maximize resemblance relative to the generated image of the second set of flow cytometer data. In such embodiments, the population of interest within the generated image of the first set of flow cytometer data is adjusted (i.e., warped) such that the contours of said population are approximately identical to the contours of the analogous population within the generated image of the second set of flow cytometer data. In other words, the processor implemented algorithm may include a mathematical deformation model configured to transform/deform the first set of flow cytometer data to resemble the second set of flow cytometer data. After the generated image of the first set of flow cytometer data is warped, the training gate contained therein may be correspondingly warped. In some embodiments, before the training gate is adjusted, it is first imposed onto a blank image (i.e., such that the training gate is the only element in the image). In other words, the training gate may be isolated from the remainder of the generated image of the first set of flow cytometer data, and imposed onto a separate image.

In some embodiments, the image registration algorithm configured to warp the generated image of the first set of flow cytometer data includes B-spline warping. In embodiments, B-spline warping includes computing B-spline coefficients, which are then used to define a function for adjusting the training gate. In other words, the image registration algorithm warps the generated image of the first set of flow cytometer data and outputs B-spline coefficients that numerically describe how the generated image of the first set of flow cytometer data was warped. These coefficients then serve as the basis for updating the vertices of the training gate such that an adjusted training gate accounting for the differences between the first and second sets of flow cytometer data is produced. Updated (i.e., adjusted) vertices can then be applied to the generated image of the second set of flow cytometer data in order to form the adjusted gate thereon.

Following adjustment of the training gate, aspects of the invention include overlaying the adjusted training gate onto the second set of flow cytometer data. In such embodiments, vertices of the adjusted training gate within the blank image are applied to the corresponding population in the generated image of the second set of flow cytometer data to form a gate around that population. In some embodiments, adjusting the vertices of the training gate to create an adjusted training gate includes extracting the vertices from the training gate (i.e., isolating and observing the positions of each vertex), altering the positions of each vertex based on B-spline coefficients (e.g., as determined above), and applying the adjusted vertices to the generated image of the second set of flow cytometer data to form the adjusted training gate. In other embodiments, the processor implemented algorithm may warp the training gate before observing the position of each vertex. In such embodiments, the processor implemented algorithm adjusts the training gate by means of the image registration algorithm (e.g., as discussed above), and then the adjusted vertices may be observed and applied to the generated image of the second set of flow cytometer data.

In some embodiments, the adjusted training gate overlaid onto the second set of flow cytometer data possesses a different shape than the original training gate, i.e., in order to accommodate the shape of the relevant population within the second set of flow cytometer data. In some instances, the relevant population within the second set of flow cytometer data is stretched, shrunk or shifted in some regions when compared to the population in the first set of flow cytometer data. As such, in some instances, the adjusted training gate is shaped such that it accommodates these differences. In some instances, the adjusted training gate is a polygon.

Figure 7:
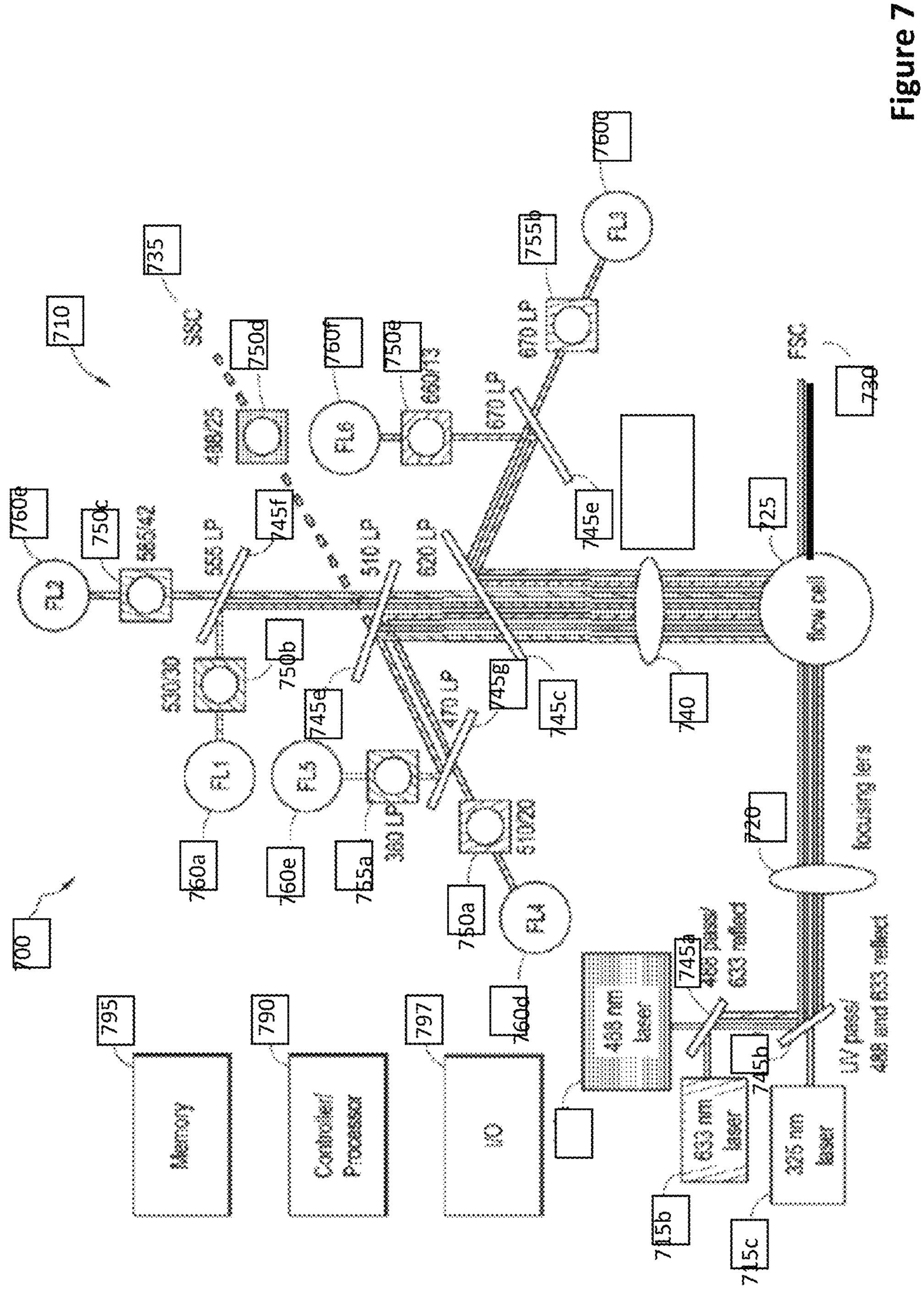
FIG. 7 depicts a flow cytometer according to certain embodiments.

FIG. 7 shows a system 700 for flow cytometry in accordance with an illustrative embodiment of the present invention. The system 700 includes a flow cytometer 710, a controller/processor 790 and a memory 795. The flow cytometer 710 includes one or more excitation lasers **715*a*-715*c*, a focusing lens 720, a flow chamber 725, a forward scatter detector 730, a side scatter detector 735, a fluorescence collection lens 740, one or more beam splitters 745*a*-745*g*, one or more bandpass filters 750*a*-750*e*, one or more longpass ("LP") filters 755*a*-755*b*, and one or more fluorescent light detectors 760*a*-760*f***.

The excitation lasers **715*a-c* emit light in the form of a laser beam. The wavelengths of the laser beams emitted from excitation lasers 715*a*-715*c* are 488 nm, 633 nm, and 325 nm, respectively, in the example system of FIG. 7. The laser beams are first directed through one or more of beam splitters 745*a* and 745*b*. Beam splitter 745*a* transmits light at 488 nm and reflects light at 633 nm. Beam splitter 745*b*** transmits UV light (light with a wavelength in the range of 10 to 400 nm) and reflects light at 488 nm and 633 nm.

The laser beams are then directed to a focusing lens 720, which focuses the beams onto the portion of a fluid stream where particles of a sample are located, within the flow chamber 725. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 730, side scatter detector 735, and the one or more fluorescent light detectors **760*a*-760*f* through one or more of the beam splitters 745*a*-745*g*, the bandpass filters 750*a*-750*e*, the longpass filters 755*a*-755*b*, and the fluorescence collection lens 740**.

The fluorescence collection lens 740 collects light emitted from the particle-laser beam interaction and routes that light towards one or more beam splitters and filters. Bandpass filters, such as bandpass filters **750*a*-750*e*, allow a narrow range of wavelengths to pass through the filter. For example, bandpass filter 750*a* is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 755*a*-755*b*, transmit wavelengths of light equal to or longer than a specified wavelength of light. For example, longpass filter 755*a***, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 705*g* is a 620 SP beam splitter, meaning that the beam splitter 745*g* transmits wavelengths of light that are 620 nm or shorter and reflects wavelengths of light that are longer than 620 nm in a different direction. In one embodiment, the beam splitters 745*a*-745*g* can comprise optical mirrors, such as dichroic mirrors.

The forward scatter detector 730 is positioned off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 735 is configured to detect refracted and reflected light from the surfaces and internal structures of the particle, and tends to increase with increasing particle complexity of structure. The fluorescence emissions from fluorescent molecules associated with the particle can be detected by the one or more fluorescent light detectors 760*a*-760*f*. The side scatter detector 735 and fluorescent light detectors can include photomultiplier tubes. The signals detected at the forward scatter detector 730, the side scatter detector 735 and the fluorescent detectors can be converted to electronic signals (voltages) by the detectors. This data can provide information about the sample.

In operation, cytometer operation is controlled by a controller/processor 790, and the measurement data from the detectors can be stored in the memory 795 and processed by the controller/processor 790. Although not shown explicitly, the controller/processor 790 is coupled to the detectors to receive the output signals therefrom, and may also be coupled to electrical and electromechanical components of the flow cytometer 700 to control the lasers, fluid flow parameters, and the like. Input/output (I/O) capabilities 797 may be provided also in the system. The memory 795, controller/processor 790, and I/O 797 may be entirely provided as an integral part of the flow cytometer 710. In such an embodiment, a display may also form part of the I/O capabilities 797 for presenting experimental data to users of the cytometer 700. Alternatively, some or all of the memory 795 and controller/processor 790 and I/O capabilities may be part of one or more external devices such as a general purpose computer. In some embodiments, some or all of the memory 795 and controller/processor 790 can be in wireless or wired communication with the cytometer 710. The controller/processor 790 in conjunction with the memory 795 and the I/O 797 can be configured to perform various functions related to the preparation and analysis of a flow cytometer experiment.

The system illustrated in FIG. 7 includes six different detectors that detect fluorescent light in six different wavelength bands (which may be referred to herein as a "filter window" for a given detector) as defined by the configuration of filters and/or splitters in the beam path from the flow cell 725 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 797 can be configured to receive data regarding a flow cytometer experiment having a panel of fluorescent labels and a plurality of cell populations having a plurality of markers, each cell population having a subset of the plurality of markers. The I/O 797 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 795. The controller/processor 790 can be configured to evaluate one or more assignments of labels to markers.

One of skill in the art will recognize that a flow cytometer in accordance with an embodiment of the present invention is not limited to the flow cytometer depicted in FIG. 7, but can include any flow cytometer known in the art. For example, a flow cytometer may have any number of lasers, beam splitters, filters, and detectors at various wavelengths and in various different configurations.

Figure 8:
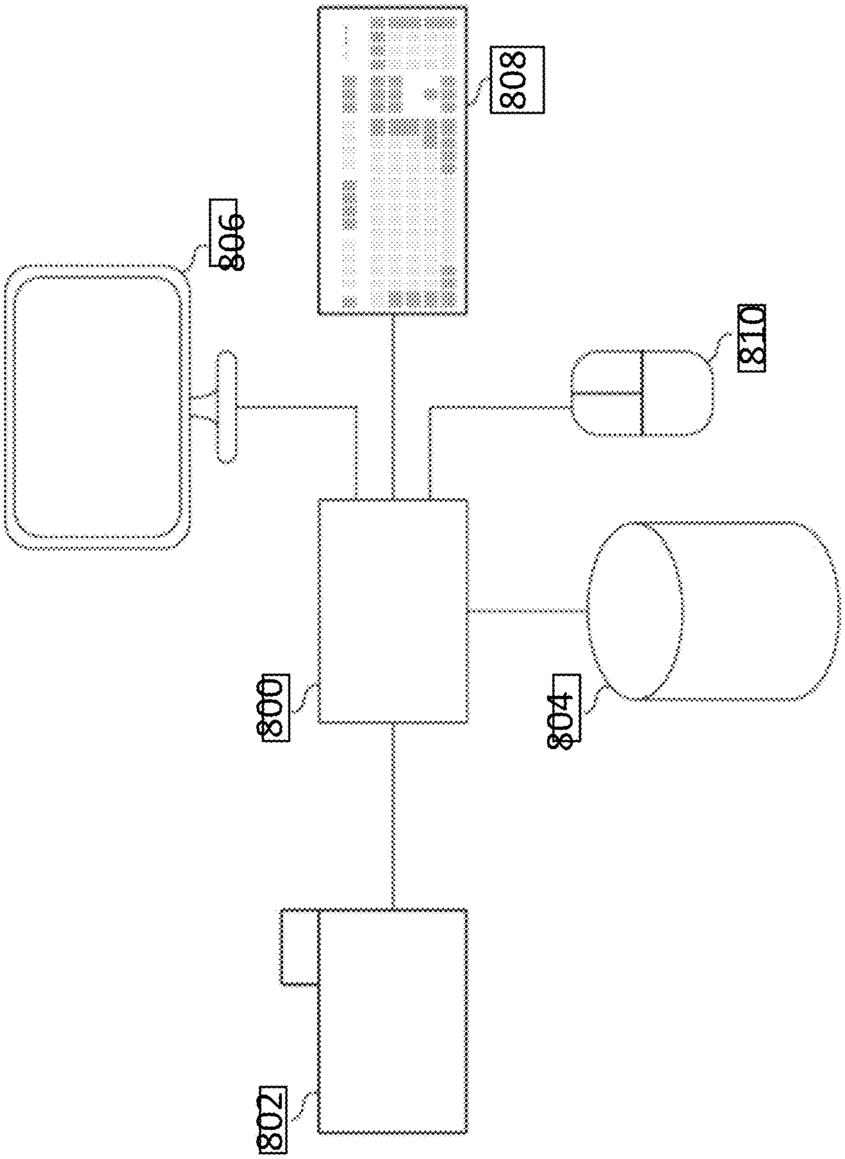
FIG. 8 depicts a functional block diagram for one example of a processor according to certain embodiments.

FIG. 8 shows a functional block diagram for one example of a processor 800, for analyzing and displaying data. A processor 800 can be configured to implement a variety of processes for controlling graphic display of biological events. A flow cytometer 802 can be configured to acquire flow cytometer data by analyzing a biological sample (e.g., as described above). The flow cytometer can be configured to provide biological event data to the processor 800. A data communication channel can be included between the flow cytometer 802 and the processor 800. The data can be provided to the processor 800 via the data communication channel. The processor 800 can be configured to provide a graphical display including plots (e.g., as described above) to display 806. The processor 800 can be further configured to render a gate around populations of flow cytometer data shown by the display device 806, overlaid upon the plot, for example. In some embodiments, the gate can be a logical combination of one or more graphical regions of interest drawn upon a single parameter histogram or bivariate plot. In some embodiments, the display can be used to display analyte parameters or saturated detector data.

The processor 800 can be further configured to display flow cytometer data on the display device 806 within the gate differently from other events in the flow cytometer data outside of the gate. For example, the processor 800 can be configured to render the color of flow cytometer data contained within the gate to be distinct from the color of flow cytometer data outside of the gate. In this way, the processor 800 may be configured to render different colors to represent each unique population of data. The display device 806 can be implemented as a monitor, a tablet computer, a smartphone, or other electronic device configured to present graphical interfaces.

The processor 800 can be configured to receive a gate selection signal identifying the gate from a first input device. For example, the first input device can be implemented as a mouse 810. The mouse 810 can initiate a gate selection signal to the processor 800 identifying the population to be displayed on or manipulated via the display device 806 (e.g., by clicking on or in the desired gate when the cursor is positioned there). In some implementations, the first device can be implemented as the keyboard 808 or other means for providing an input signal to the processor 800 such as a touchscreen, a stylus, an optical detector, or a voice recognition system. Some input devices can include multiple inputting functions. In such implementations, the inputting functions can each be considered an input device. For example, as shown in FIG. 8, the mouse 810 can include a right mouse button and a left mouse button, each of which can generate a triggering event.

The triggering event can cause the processor 800 to alter the manner in which the flow cytometer data is displayed, which portions of the data is actually displayed on the display device 806, and/or provide input to further processing such as selection of a population of interest for analysis.

In some embodiments, the processor 800 can be configured to detect when gate selection is initiated by the mouse 810. The processor 800 can be further configured to automatically modify plot visualization to facilitate the gating process. The modification can be based on the specific distribution of data received by the processor 800.

The processor 800 can be connected to a storage device 804. The storage device 804 can be configured to receive and store data from the processor 800. The storage device 804 can be further configured to allow retrieval of data, such as flow cytometer data, by the processor 800.

A display device 806 can be configured to receive display data from the processor 800. The display data can comprise plots of flow cytometer data and gates outlining sections of the plots. The display device 806 can be further configured to alter the information presented according to input received from the processor 800 in conjunction with input from apparatus 802, the storage device 804, the keyboard 808, and/or the mouse 810.

In some implementations the processor 800 can generate a user interface to receive example events for sorting. For example, the user interface can include a control for receiving example events or example images. The example events or images or an example gate can be provided prior to collection of event data for a sample, or based on an initial set of events for a portion of the sample.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for obtaining a first set of flow cytometer data containing a training gate and a second set of flow cytometer data, organizing the data into two-dimensional bins, creating a histogram and cumulative distribution function based on the two-dimensionally binned data, determining an image generation value based on the cumulative distribution function, generating an image for each of the first and second sets of flow cytometer data by assigning a shade to each bin based on the corresponding image generation values, warping the generated image of the first set of flow cytometer data to maximize resemblance to the generated image of the second set of flow cytometer data, using B-spline coefficients from warping the generated image of the first set of flow cytometer data to adjust the training gate, and overlaying the training gate onto the generated image of the second set of flow cytometer data.

In embodiments, the system is configured to analyze the data within a software or an analysis tool for analyzing flow cytometer data or nucleic acid sequence data, such as FlowJo® (Ashland, OR). FlowJo® is a software package developed by FlowJo LLC (a subsidiary of Becton Dickinson) for analyzing flow cytometer data. The software is configured to manage flow cytometer data and produce graphical reports thereon (https://www(dot)flowjo(dot)com/learn/flowjo-university/flowjo). The initial data can be analyzed within the data analysis software or tool (e.g., FlowJo®) by appropriate means, such as manual gating, cluster analysis, or other computational techniques. The instant systems, or a portion thereof, can be implemented as software components of a software for analyzing data, such as FlowJo®. In these embodiments, computer-controlled systems according to the instant disclosure may function as a software "plugin" for an existing software package, such as FlowJo®.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT, Windows XP, Windows 7, Windows 8, iOS, Sun Solaris, Linux, OS/400, Compaq Tru64 Unix, SGI IRIX, Siemens Reliant Unix, and others.

Figure 9:
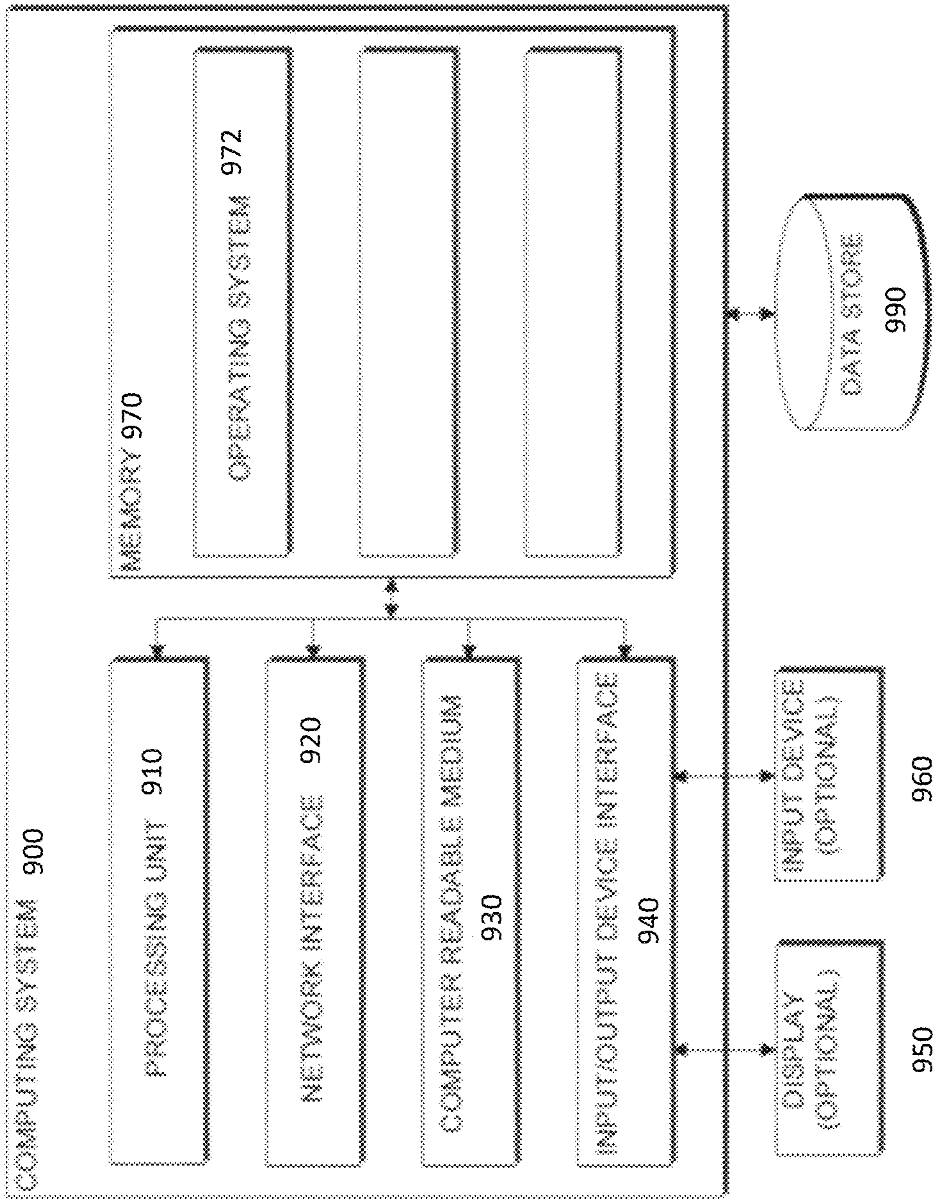
FIG. 9 depicts a block diagram of a computing system according to certain embodiments.

FIG. 9 depicts a general architecture of an example computing device 900 according to certain embodiments. The general architecture of the computing device 900 depicted in FIG. 9 includes an arrangement of computer hardware and software components. It is not necessary, however, that all of these generally conventional elements be shown in order to provide an enabling disclosure. As illustrated, the computing device 900 includes a processing unit 910, a network interface 920, a computer readable medium drive 930, an input/output device interface 940, a display 950, and an input device 960, all of which may communicate with one another by way of a communication bus. The network interface 920 may provide connectivity to one or more networks or computing systems. The processing unit 910 may thus receive information and instructions from other computing systems or services via a network. The processing unit 910 may also communicate to and from memory 970 and further provide output information for an optional display 950 via the input/output device interface 940. For example, an analysis software (e.g., data analysis software or program such as FlowJo®) stored as executable instructions in the non-transitory memory of the analysis system can display the flow cytometry event data to a user. The input/output device interface 940 may also accept input from the optional input device 960, such as a keyboard, mouse, digital pen, microphone, touch screen, gesture recognition system, voice recognition system, gamepad, accelerometer, gyroscope, or other input device.

The memory 970 may contain computer program instructions (grouped as modules or components in some embodiments) that the processing unit 910 executes in order to implement one or more embodiments. The memory 970 generally includes RAM, ROM and/or other persistent, auxiliary or non-transitory computer-readable media. The memory 970 may store an operating system 972 that provides computer program instructions for use by the processing unit 910 in the general administration and operation of the computing device 900. Data may be stored in data storage device 990. The memory 970 may further include computer program instructions and other information for implementing aspects of the present disclosure.

Computer-Readable Storage Media

Aspects of the present disclosure further include non-transitory computer readable storage media having instructions for practicing the subject methods. Computer readable storage media may be employed on one or more computers for complete automation or partial automation of a system for practicing methods described herein. In some embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. In some instances, instructions may be provided on an integrated circuit device. Integrated circuit devices of interest may include, in certain instances, a reconfigurable field programmable gate array (FPGA), an application specific integrated circuit (ASIC) or a complex programmable logic device (CPLD). A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions for obtaining a first set of flow cytometer data containing a training gate and a second set of flow cytometer data, organizing the data into two-dimensional bins, creating a histogram and cumulative distribution function based on the two-dimensionally binned data, determining an image generation value based on the cumulative distribution function, generating an image for each of the first and second sets of flow cytometer data by assigning a shade to each bin based on the corresponding image generation values, warping the generated image of the first set of flow cytometer data to maximize resemblance to the generated image of the second set of flow cytometer data, using B-spline coefficients from warping the generated image of the first set of flow cytometer data to adjust the training gate, and overlaying the training gate onto the generated image of the second set of flow cytometer data.

In embodiments, the system is configured to analyze the data within a software or an analysis tool for analyzing flow cytometer data or nucleic acid sequence data, such as FlowJo®. The initial data can be analyzed within the data analysis software or tool (e.g., FlowJo®) by appropriate means, such as manual gating, cluster analysis, or other computational techniques. The instant systems, or a portion thereof, can be implemented as software components of a software for analyzing data, such as FlowJo®. In these embodiments, computer-controlled systems according to the instant disclosure may function as a software "plugin" for an existing software package, such as FlowJo®.

The computer readable storage medium may be employed on more or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, Python, C++, other high level or low level languages, as well as combinations thereof, as is known in the art. The operating system also provides scheduling, input-output control, file and data management, memory management, and communication control and related services, all in accordance with known techniques.

Utility

The subject devices, methods and computer systems find use in a variety of applications where it is desirable to gate flow cytometer data. For example, the present disclosure finds use in obtaining a gate from a set of flow cytometer data and adjusting that gate to fit a second set of flow cytometer data. As such, the disclosure finds use in adapting an existing gate taken from a previously-characterized set of flow cytometer data and applying it to a set of flow cytometer data that has yet to be gated. In other words, the disclosure finds use in fitting an existing gate from one set of flow cytometer data to the same population within a second set of flow cytometer data, even if the population has shrunk, stretched or shifted slightly. As such, the present methods, systems and computer-controlled systems do not require the user to manually redraw a gate or manipulate the vertices thereof to draw a new gate, thereby improving efficiency of flow cytometer data analysis. In some embodiments, the subject methods and systems provide fully automated protocols so that adjustments to data require little, if any, human input.

The present disclosure can be employed to characterize many types of analytes, in particular, analytes relevant to medical diagnosis or protocols for caring for a patient, including but not limited to: proteins (including both free proteins and proteins and proteins bound to the surface of a structure, such as a cell), nucleic acids, viral particles, and the like. Further, samples can be from in vitro or in vivo sources, and samples can be diagnostic samples.

Kits

Aspects of the present disclosure further include kits, where kits include storage media such as a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS). Any of these program storage media, or others now in use or that may later be developed, may be included in the subject kits. In embodiments, the instructions contained on computer readable media provided in the subject kits, or a portion thereof, can be implemented as software components of a software for analyzing data, such as FlowJo®. In these embodiments, computer-controlled systems according to the instant disclosure may function as a software "plugin" for an existing software package, such as FlowJo®.

In addition to the above components, the subject kits may further include (in some embodiments) instructions, e.g., for installing the plugin to the existing software package such as FlowJo®. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A method comprising:

obtaining a first and a second set of flow cytometer data, wherein the first set of flow cytometer data comprises a training gate defined by a set of vertices;

generating an image for each of the obtained first and second sets of flow cytometer data by:

organizing the flow cytometer data into two-dimensional bins;

creating a histogram based on average values of the two-dimensional binned data and a parameter;

calculating a cumulative distribution function based on the histogram; and determining an image generation value associated with a shade for each two-dimensional bin based on the cumulative distribution function;

displaying the generated image of each of the first and second sets of flow cytometer data on a graphical user interface wherein each two-dimensional bin is represented by a pixel of the associated shade;

warping the generated image of the first set of flow cytometer data to maximize similarity relative to the generated image of the second set of flow cytometer data with a processor implemented image registration algorithm to compute B-spline coefficients that define a function for how the generated image of the first set of flow cytometer data was warped;

automatically adjusting the training gate using the computed B-spline coefficients;

characterizing one or more populations in the second set of flow cytometer data by applying the adjusted training gate to the generated image of the second set of flow cytometer data; and displaying the characterized populations and the adjusted training gate on the graphical user interface.

2. The method according to claim 1, wherein adjusting the training gate comprises imposing the training gate onto a blank image.

3. The method according to claim 2, wherein the processor implemented algorithm is configured to adjust the training gate imposed onto the blank image.

4. The method according to claim 3, further comprising overlaying the adjusted training gate to the second set of flow cytometer data by applying the vertices of the adjusted gate from the blank image to the generated image of the second set of flow cytometer data.

5. The method according to claim 1, wherein a two-dimensional bin associated with a larger image generation value is assigned a lighter shade and a two-dimensional bin associated with a smaller image generation value is assigned a darker shade.

6. The method according to claim 1, wherein a two-dimensional bin associated with an image generation value under a threshold is assigned black.

7. The method according to claim 6, wherein the threshold is adjustable.

8. The method according to claim 1, wherein the image is a greyscale image.

9. The method according to claim 1, wherein the image is a color image.

10. The method according to claim 1, wherein the training gate is drawn by a user.

11. The method according to claim 1, wherein the adjusted training gate possesses a different shape than the training gate.

* * * * *